(12) United States Patent
Nakamura (10) Patent No.: US 7,677,646 B2
(45) Date of Patent: Mar. 16, 2010

(54) VEHICLE FRAME FOR WORK VEHICLE AND METHOD FOR MANUFACTURING SAME

(75) Inventor: Norimi Nakamura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/508,118

(22) Filed: Aug. 22, 2006

(65) Prior Publication Data

US 2007/0210617 A1    Sep. 13, 2007

(30) Foreign Application Priority Data

Mar. 13, 2006   (JP)   ............................. 2006-067683
Mar. 13, 2006   (JP)   ............................. 2006-067684

(51) Int. Cl.
*B60J 5/04* (2006.01)

(52) U.S. Cl. ................................. 296/190.08; 296/205

(58) Field of Classification Search ............. 296/146.9, 296/187.12, 190.08, 193.05, 202, 203.03, 296/205, 204

See application file for complete search history.

(56) References Cited

U.S. PATENT DOCUMENTS

| | | | | | |
|---|---|---|---|---|---|
| 3,055,699 | A | * | 9/1962 | May ....................... | 296/190.08 |
| 3,061,360 | A | * | 10/1962 | Wilfert ....................... | 296/205 |
| 3,341,247 | A | * | 9/1967 | Martinmaas ............ | 296/190.08 |
| 3,619,535 | A | * | 11/1971 | Sullivan ...................... | 219/612 |
| 4,605,259 | A | * | 8/1986 | Hurlburt ................. | 296/190.08 |
| 4,772,065 | A | * | 9/1988 | Nakata et al. ................ | 264/279 |
| 4,986,597 | A | * | 1/1991 | Clausen ....................... | 296/205 |
| 5,213,386 | A | * | 5/1993 | Janotik et al. .................. | 296/29 |
| 5,273,340 | A | * | 12/1993 | Nelson et al. ........... | 296/190.08 |
| 5,327,989 | A |  | 7/1994 | Furuhashi et al. | |
| 6,012,765 | A | * | 1/2000 | Novoa et al. ........... | 296/190.08 |
| 6,022,070 | A | * | 2/2000 | Ashina et al. ................ | 296/205 |
| 6,092,865 | A | * | 7/2000 | Jaekel et al. ................ | 296/205 |
| 6,139,094 | A | * | 10/2000 | Teply et al. ............ | 296/203.03 |
| 6,250,410 | B1 |  | 6/2001 | Balestrini et al. | |
| 6,260,912 | B1 | * | 7/2001 | Mondragon Sarmiento et al. ...................... | 296/190.08 |
| 6,282,790 | B1 | * | 9/2001 | Jaekel et al. ................ | 29/897.2 |
| 6,315,351 | B1 | * | 11/2001 | Mondragon Sarmiento et al. ...................... | 296/190.08 |
| 6,485,084 | B2 | * | 11/2002 | Sorensen et al. ............ | 296/102 |

(Continued)

FOREIGN PATENT DOCUMENTS

DE          2643156      *    3/1978

(Continued)

*Primary Examiner*—Glenn Dayoan
*Assistant Examiner*—Paul A Chenevert
(74) *Attorney, Agent, or Firm*—The Webb Law Firm (57) ABSTRACT

The vehicle frame for a work vehicle includes a cabin frame that is assembled into a substantially box form. A base frame is welded to the cabin frame. The cabin frame includes left and right side frames, each of which is formed into a loop. The cabin member includes a plurality of cross members for connecting the left and right side frames. Each of the side frames is formed with a single one-piece pipe material having a first end and a second end with the first end connected to the second end such that a tangential direction extending along a region of the first end coincides with a tangential direction extending along a region of the second end. The pipe material has an irregular shape having a recess formed along the entire length between the first end and the second end of the pipe material.

5 Claims, 11 Drawing Sheets

U.S. PATENT DOCUMENTS

| | | |
|---|---|---|
| 6,572,179 B2 * | 6/2003 | Dahl et al. .............. 296/190.08 |
| 6,582,010 B2 * | 6/2003 | Sakyo et al. ........... 296/190.08 |
| 6,948,768 B2 * | 9/2005 | Corcoran et al. ....... 296/190.08 |
| 2001/0050495 A1 | 12/2001 | Sorensen et al. |
| 2006/0006696 A1 * | 1/2006 | Umemoto et al. ...... 296/190.08 |
| 2007/0214818 A1 * | 9/2007 | Nakamura ................... 62/239 |
| 2008/0084091 A1 * | 4/2008 | Nakamura et al. ..... 296/190.08 |
| 2008/0093883 A1 * | 4/2008 | Shibata et al. ........... 296/146.9 |
| 2009/0058146 A1 * | 3/2009 | Kobayashi et al. .......... 296/204 |

FOREIGN PATENT DOCUMENTS

| | | | |
|---|---|---|---|
| EP | 0955229 A1 | 11/1999 | |
| GB | 1355896 A | 6/1974 | |
| JP | 01-202582 | 8/1989 | |
| JP | 06211048 A * | 8/1994 | .............. 296/146.9 |
| JP | 11-091638 | 4/1999 | |
| JP | 2001-191958 | 7/2001 | |
| JP | 2004-161114 | 6/2004 | |
| JP | 2005-212521 | 8/2005 | |
| JP | 2006-036073 | 2/2006 | |

* cited by examiner

VEHICLE FRAME FOR WORK VEHICLE AND METHOD FOR MANUFACTURING SAME

BACKGROUND OF THE INVENTION

The present invention is directed to a vehicle frame for a work vehicle and methods for manufacturing the frame.

A frame structure where the cabin frame is bolted to the vehicle frame is disclosed, for example, in JP2001-191958 (paragraph numbers 0027, 0029, FIG. 1, FIG. 7) and also a structure driving cabin is supported at the back of the vehicle body through a vibration control connection portion is disclosed, for example, in JP2006-36073 (paragraph number 0013, FIG. 1, FIG. 2, FIG. 5).

Other examples of the cabin structure for work vehicles include one, for example, JP H11-91638 (paragraph number 0023, FIGS. 1-5), where each corner of the cabin frame is formed so that the corners form sharp angles with a pair of right and left vertical front frames, a pair of right and left vertical rear frames, a pair of right and left upper fore-and-aft frames extending in the fore-and-aft direction, a pair of right and left lower fore-and-aft frames extending in the fore-and-aft direction, a pair of front and rear laterally extending upper lateral frame, a single lateral lower lateral frame, and a plurality of connecting member that connect ends of corresponding frames, and one, for example, JP 2005-212521 (paragraph number 0016, FIGS. 1-6), where each corner of the cabin frame is formed so that the corners form sharp angles with a pair of right and left vertical front frames, a pair of right and left vertical rear frames, a pair of right and left upper fore-and-aft lateral frames extending in the fore-and-aft direction between the corresponding upper portions of the front vertical frame and the rear vertical frame, and a pair of right and left lower fore-and-aft lateral frames extending in the fore-and-aft direction between the corresponding lower portions of the front vertical frame and the rear vertical frame.

With the above-mentioned structure, for a cabin frame (driving cabin) to have sufficient strength to protect the passenger, and for the vehicle frame (vehicle body) to be able to mount the cabin frame, the cabin frame needs to be equipped with structurally strong members and reinforcing members to provide them with sufficient strength. As a result, the component parts of the frame increase in number and the frame structure becomes more complicated, resulting in an increased overall weight of the vehicle with a higher manufacturing cost, lower productivity and less efficient fuel consumption, etc.

In the structure described above, because the cabin frame is formed so that each corner thereof forms a sharp angle, stress tends to be concentrated on each corner when an outside force is applied to the cabin frame, which tends to increase the possibility of deforming the cabin frame due to concentration of stress.

SUMMARY OF THE INVENTION

An object of the present invention is to improve the frame structure. Another object is to lessen the possibility of deformation to the cabin frame caused by concentrated stress without increasing the complexity of its structure.

The vehicle frame for a work vehicle in accordance with the present invention comprises a cabin frame that is assembled into a substantially box form and a base frame welded to the cabin frame. The side frame is preferably formed with pipe material that is formed into a loop.

The method of manufacturing a frame for a work vehicle in accordance with the present invention comprises forming a cabin frame that is assembled into a substantially box form; forming a base frame; and welding the base frame to the cabin frame.

DETAILED DESCRIPTION OF PREFERRED EMBODIMENTS

Figure 1:
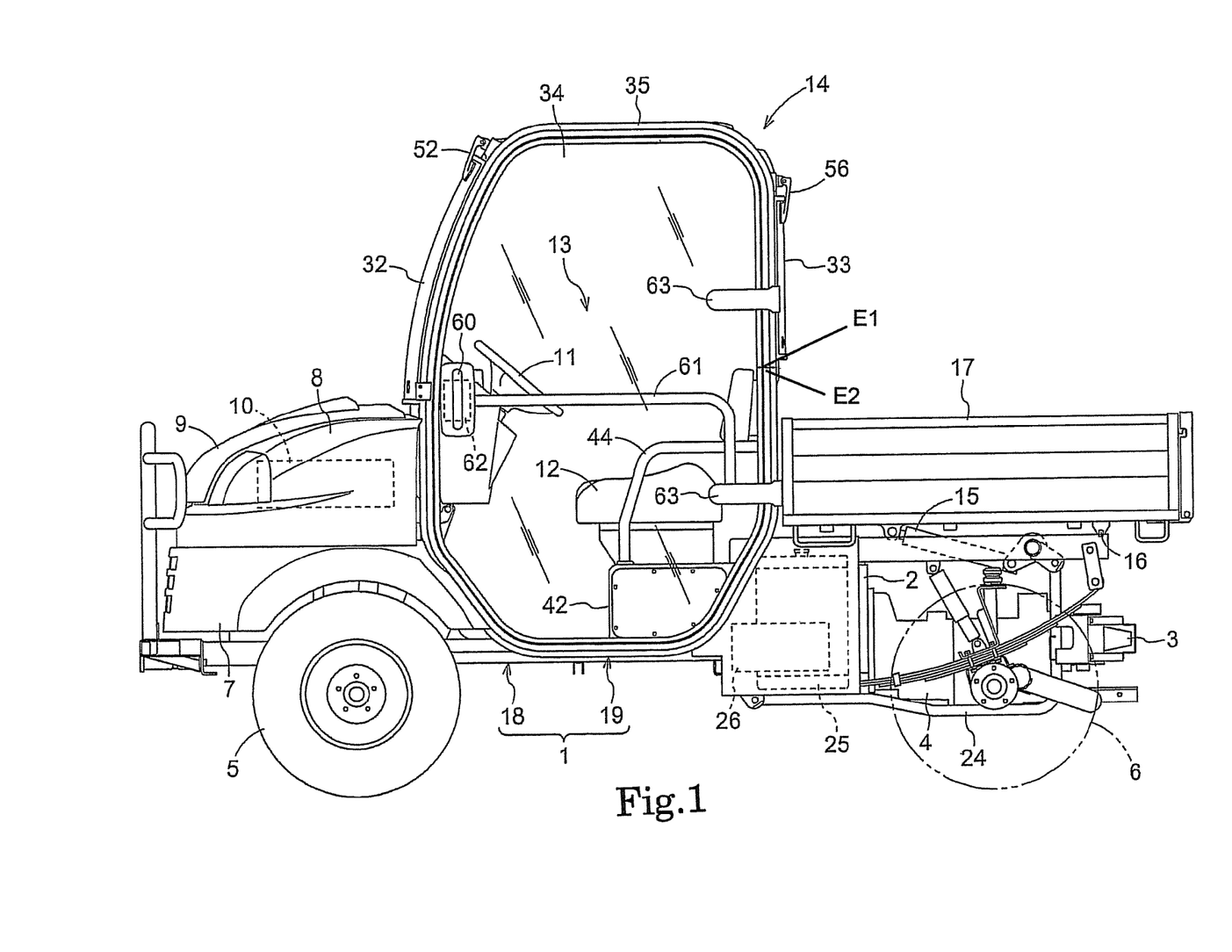
FIG. 1 is a side view of the work vehicle.
Figure 2:
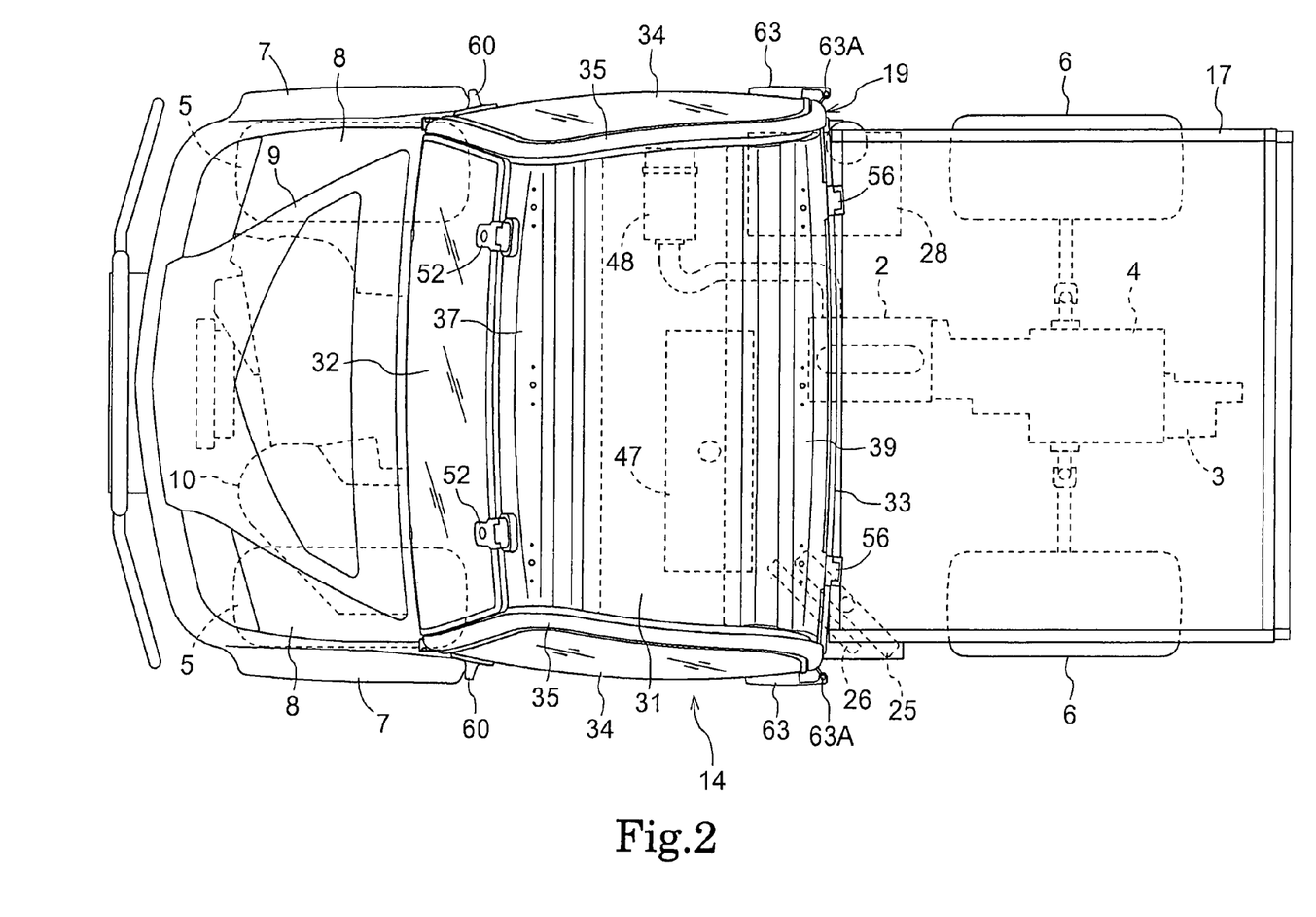
FIG. 2 is a plan view of the work vehicle.
Figure 3:
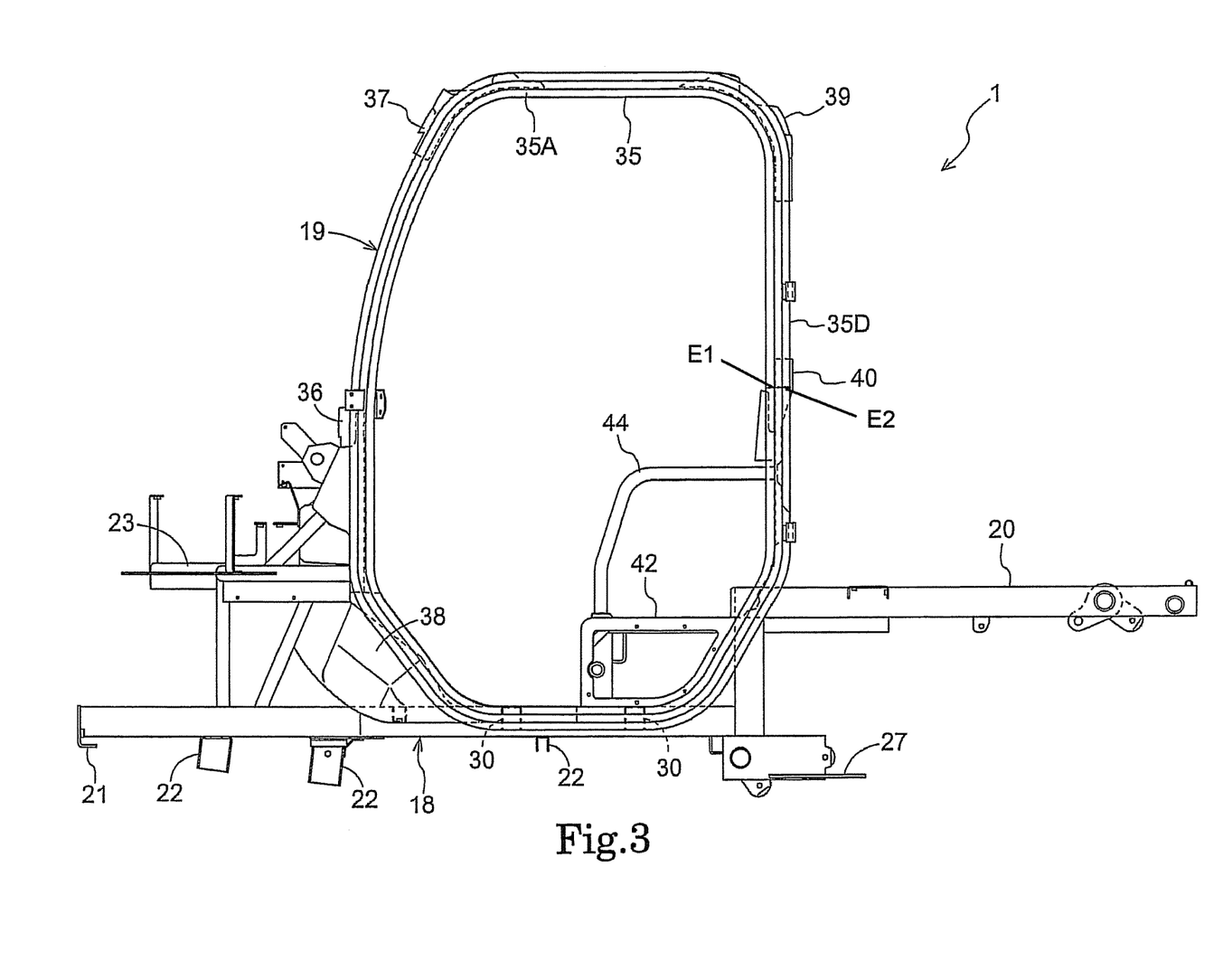
FIG. 3 is a side view showing the frame structure of the work vehicle.
Figure 4:
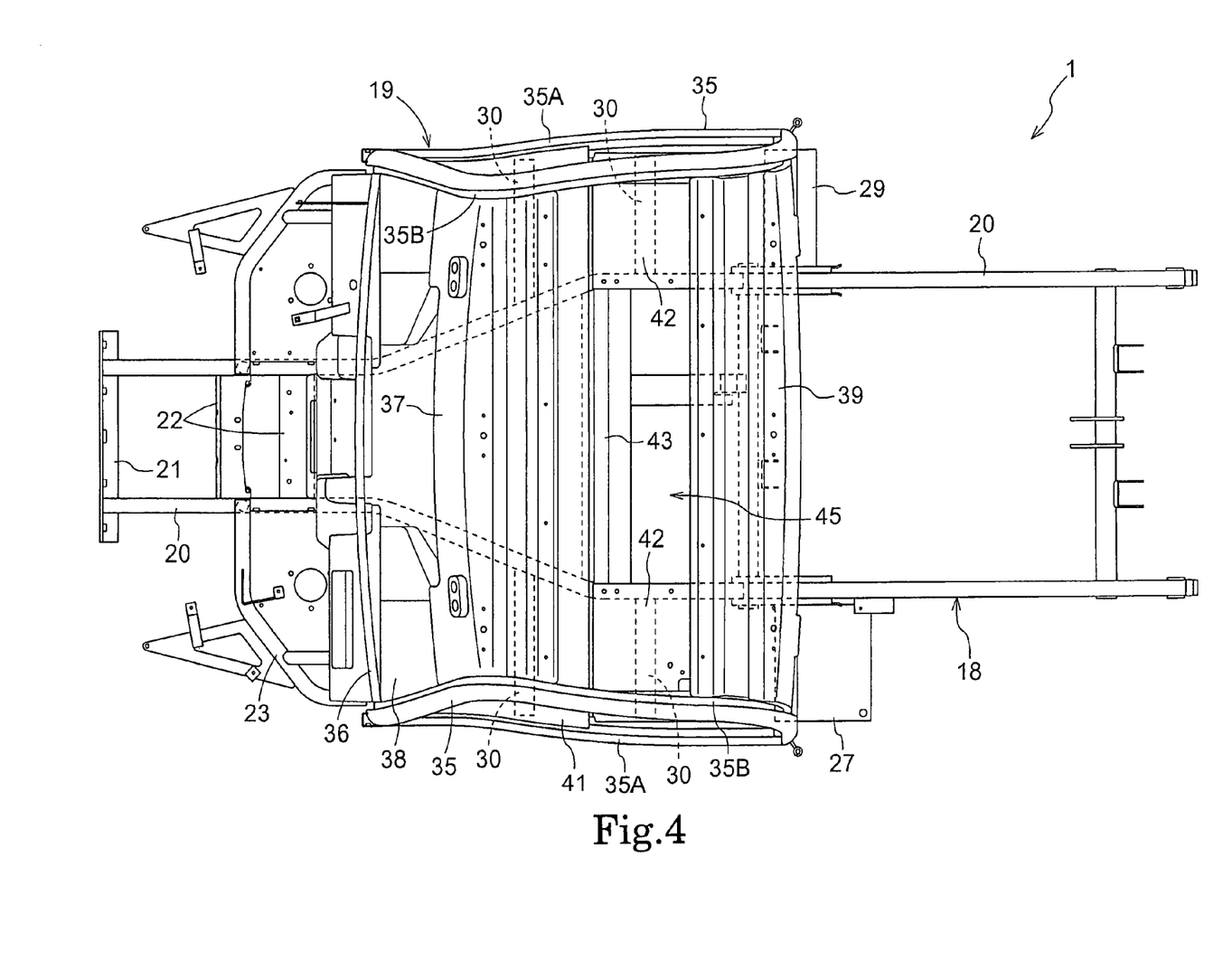
FIG. 4 is a plan view showing the frame structure of the work vehicle.

In FIG. 1, the entire side view of the work vehicle suitable for transporting articles is shown, while the plan view is shown in FIG. 2. This work vehicle is a four-wheel-drive type where the power from the air-cooled engine 2, which is supported on the vehicle frame 1 via a vibration insulator, is transmitted through the hydrostatic type continuously variable speed change device 3 and the gear type speed change device 4, etc. to a pair of right and left front wheels 5 and the rear wheels 6.

The front of the vehicle provides a lower covering 7 that also functions as a front-wheel fender, an upper cover 8 with an opening in the upper and lateral central region, and a hood 9 that can cover and uncover the opening which can be opened and closed by pivoting it, etc. The accommodation space formed houses the air conditioning unit 10, etc.

Provided in the longitudinally intermediate region of the work vehicle is the operator's area 13 with the steering wheel 11 for steering the front-wheels and the sofa type seat 12 supported for easy removal, etc. The cabin 14 which forms an operator space is also provided.

Arranged at the back of the work vehicle is a loading platform 17 that can pivot about the laterally extending shaft 16 arranged in the rear end part of the vehicle frame 1 by actuation of the hydraulic dump cylinder 15 arranged above the gear type speed change device 4.

As shown in FIGS. 1-6, the vehicle frame 1 has a welded integral construction connecting the base frame 18 with the cabin frame 19 by welding. The cabin frame 19 that is constructed with sufficient strength to protect a passenger is also adapted to function as a reinforcement member for the vehicle frame 1.

The base frame 18 is formed by welding together: right and left side members 20, the cross member 21 with an L-shaped cross-sectional configuration, bracket shaped cross members 22, and the support frame 23 for air conditioning units, etc. The base frame 18, at its rear, supports the engine 2, and the gear type speed change device 4, etc. through the support frame 24 with vibration control connection equipment.

A support component 27 which supports a radiator 25, an oil cooler 26, etc. is welded on the left-hand side of the engine 2 to the base frame 18, and a support component 29 which supports the fuel tank 28 is welded to the base frame 18 on the right-hand side of the engine 2.

Each of the side members 20 on either side is formed by welding a plurality of square pipe materials with its rear half higher than its first half to form a crank bar shape. A pair of front and rear connecting members 30 each with a bracket shaped cross-sectional configurations is welded to side members 20 at the rear region of the first half such that the connecting member extends laterally of the vehicle body.

As shown in FIGS. 1 and 2, an engine 2 is aligned such that the output shaft (not shown) extends along with the lateral direction of the vehicle body and is positioned in the rear of the vehicle body such that its front part overlaps with the side of a cabin 14 in side view. The gear type speed change device 4 is directly coupled with the back end of the engine 2, and the hydrostatic type continuously variable speed change device 3 is connected to the back end of the gear type speed change device 4.

A cabin 14 has the cabin frame 19 with a seat 12, a roof panel 31, the front panel 32, the rear panel 33, a pair of right and left door 34 of an out-swinging type, etc.

As shown in FIGS. 1-7, the cabin frame 19 has the pair of right and left side frames 35 forming the doorway, the 1st cross member 36 extending between the front portions of the right and left side frames 35, the 2nd cross member 37 extending between the front upper parts of the right and left side frames 35, the 3rd cross member 38 extending between the front lower parts of the right and left side frames 35 on either side, the 4th cross member 39 extending between the back upper parts of the right and left side frames 35, the 5th cross member 40 extending between the backs of the right and left side frames 35, the 6th cross member 41 extending between the bottoms of the right and left side frames 35, and the seat support member 42 made from a sheet metal extending between the 5th and 6th cross members, the connecting member 43 extending between front upper portions of the right and left seat support members 42, a pair of right and left handrail members 44 extending between the 5th cross member 40 and the seat support components 42, all of which are welded together to form a box like frame to provide strength.

As shown in FIGS. 4-7, a covering 46 made from sheet metal for covering the opening 45 formed between the seat support members 42 is attached such that the covering can be easily removed. Supplying oil to the oil tank 47 arranged at the back lower part of the cabin 14 etc. can be easily performed by uncovering the opening 45 by removing this covering 46 and the seat 12.

Figure 7:
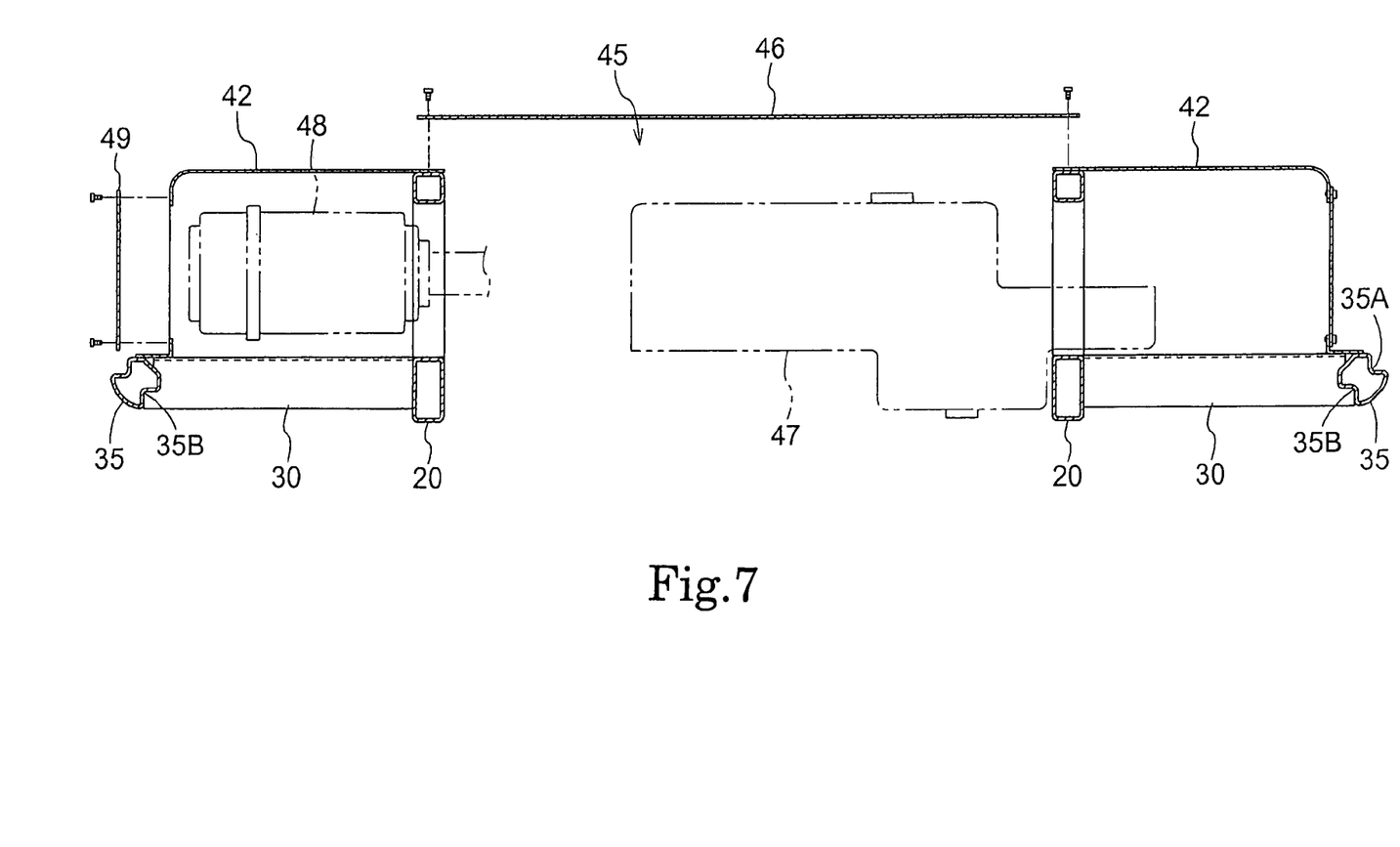
FIG. 7 is a vertical sectional front view of the frame structure below the seat.

As shown in FIGS. 2 and 7, the air cleaner 48 is arranged under the right-hand side seat support member 42. Elements of this air cleaner 48 can be easily replaced by removing the covering 49 that is removably bolt-connected to the right side part of the right-hand side seat support component 42.

As shown in FIGS. 1-6, each of the right and left side frames 35 is formed by three dimensionally gently bending a single irregularly shaped pipe 35 such that the frame 35 has a three dimensional curve with a relatively small curvature both in the lateral direction and longitudinal direction to improve appearance or an aerodynamic characteristic, after which bending, both ends E1 and E2 are aligned straight in the back central location of the frame and are welded, and a closed-loop formed by grinding and smoothing the welded joint.

Thus, forming each of the right and left side frames 35 in a closed-loop with a three-dimensional curve that not only can improve appearance or an aerodynamic characteristic, but any external force applied to the cabin frame 19 is more readily absorbed and dissipated by the right and left side frames 35, which effectively prevents deformation or breakage, etc. of the cabin frame 19 due to local stress concentration.

And, since each of the side frames 35 is formed from a single irregularly shaped pipe 35, the structure provides better visibility and larger space because of the narrower frame width of the side frames 35, while reducing weight and improving strength of the side frames 35, and reducing the number of component parts of the side frames 35 and reducing production costs and improving productivity due to reduction in the number of welding points and smoothing points.

As shown in FIGS. 3-12, the irregularly shaped pipe 35 has a pair of V-shaped recesses 35A and 35B extending straight along its entire length and formed on the opposite sides and one of the non-recessed portions is chamfered to form a straight chamfered portion 35C so that the pipe has a gourd-shaped cross section. The irregularly shaped pipe 35 is bent such that one recess 35A forms the outside inner periphery edge of the side frame 35, and the recess 35B on the other side forms the inner side perimeter edge of the side frame 35 and the chamfered portion 35C forms the inner side inner periphery edge of the side frame 35.

With this construction, the outward peripheral surface part 35a formed on one side face of the recess 35A forming the outside inner periphery edge of each side frame 35 can be used as a door receiving surface 35a which receives the door 34 on either side.

Figure 9:
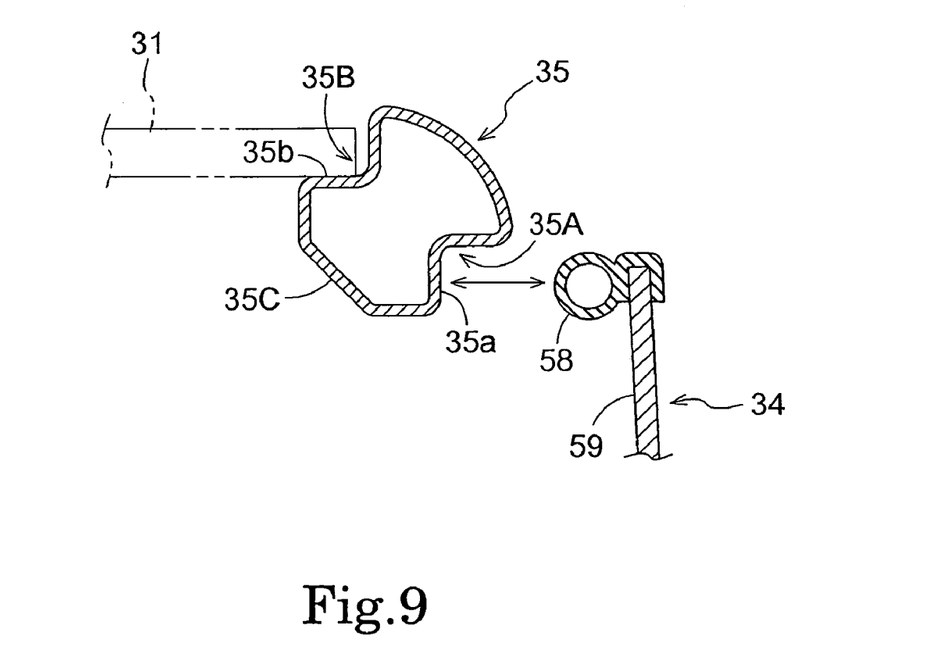
FIG. 9 is a cross-sectional vertical view of the receiving structure for the door and the roof panel at the upper part of the cabin.

The upward surface part 35b, formed on one side face of the recess 35B and forming the inner side perimeter edge of each side frame 35, can be used as a roof receiving surface 35b which receives a roof panel 31 (see FIG. 9).

Figure 8:
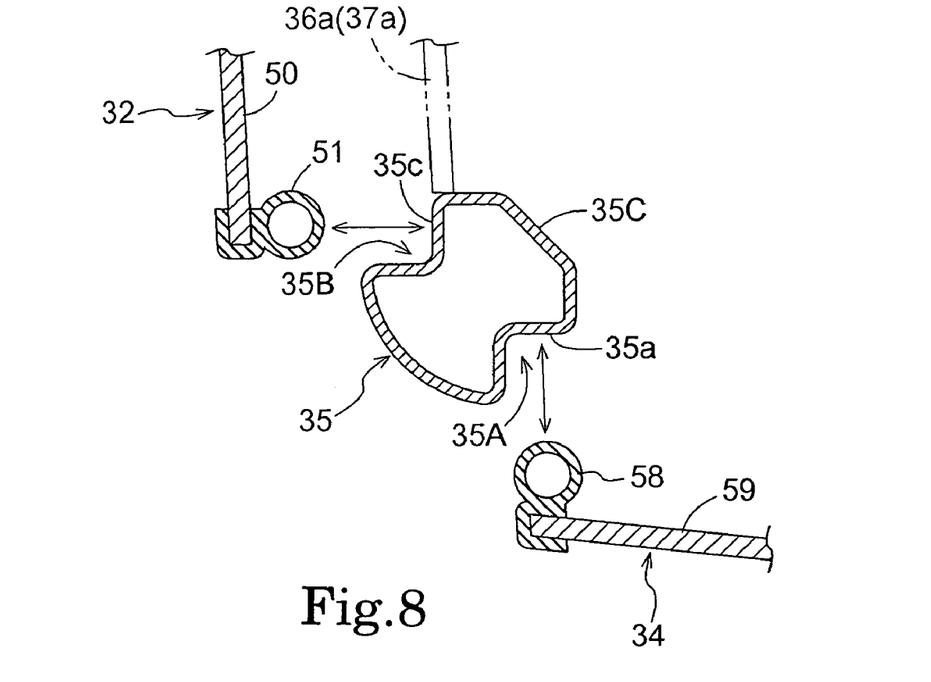
FIG. 8 is a cross-sectional plan view of the receiving structure for the door and the front panel at the front part of the cabin.

The forward facing surface 35c, formed on one side face of the recess 35B and forming the inner side perimeter edge of each side frame 35, can be used as a front receiving surface 35c which receives the front panel 32 (see FIG. 8).

Figure 11:
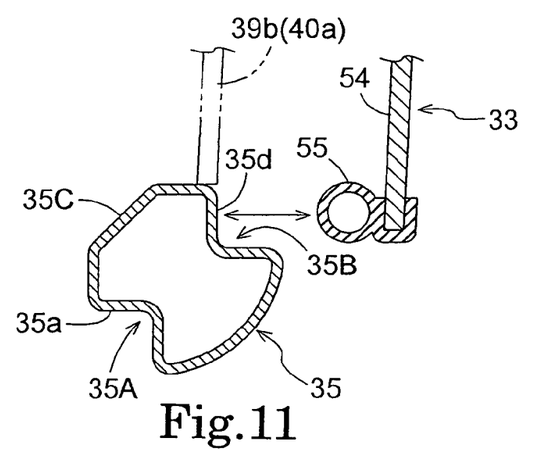
FIG. 11 is a cross-sectional plan view of the receiving structure for the door and the rear panel at the rear part of the cabin.
Figure 12:
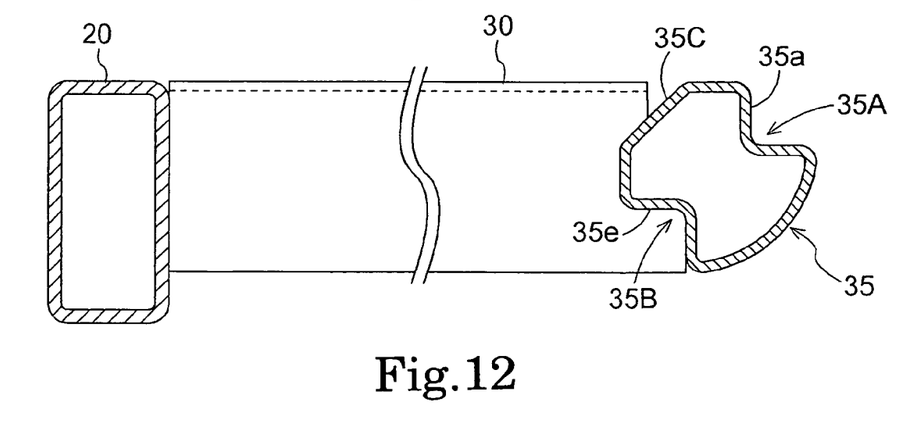
FIG. 12 is a vertical view showing the connection portion between the base frame and the cabin frame.
Figure 13:
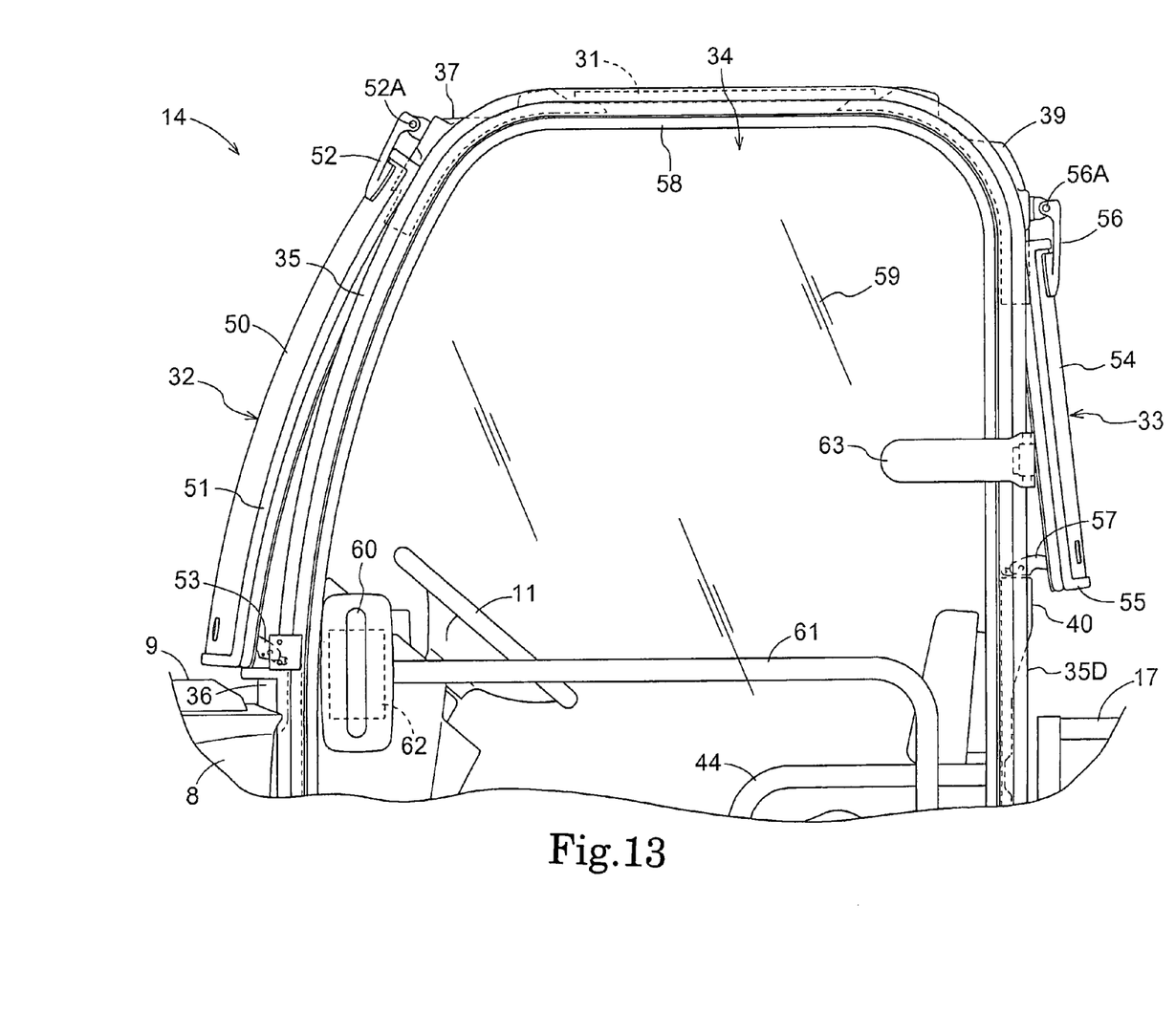
FIG. 13 is a side view of the cabin structure.

The rearward surface 35d, formed on one side face of the recess 35B and forming the inner side perimeter edge of each side frame 35, can be used as rear receiving surface 35d which receives the rear panel 33 (see FIG. 11).

The downward part 35e of the recess 35B, forming the inner side perimeter edge of each side frame 35, can be used as a positioning member 35e which determines the lateral positional relationship between the base frame 18 and the cabin frame 19 through contact with the outer end of the connecting member 30 that are connected to either side of the base frame 18 by welding.

That is, recesses 35A and 35B of the irregularly shaped pipe 35 are effectively used to provide receiving surfaces 35a-35d for panels 31-33 or for the door 34 on either side, or as a positioning part 35e for determining the lateral positioning of the base frame 18, productivity is improved as compared with the case where those receiving surfaces 35a-35d and positioning parts 35e are provided as additional members.

Moreover, since the peripheral edge part of each panels 31-33 and the peripheral edge part of each door 34 on either side are inserted into and are hidden in recesses 35A and 35B of the irregularly shaped pipe 35, the appearance or an aerodynamic characteristic are improved and inflow of rain high-pressure-washing water, or dust through the joints between recesses 35A and 35B, and panels 31-33 and door 34, can be reliably prevented.

And by forming the inner side inner periphery edge of the side frame 35 by the chamfered portion 35C of the irregularly shaped pipe 35a, the inner side inner periphery edge does not unnecessarily project inwardly of cabin 14, thus preventing giving a passenger a feeling of oppression by the inward projection of the inner periphery edge.

As shown in FIGS. 4-8, 10, and 11, the sheet-metal material pressed for greater strength is used for cross members 36-41 which allows reduction in weight while maintaining a high degree of strength as a cabin frame 19.

Figure 5:
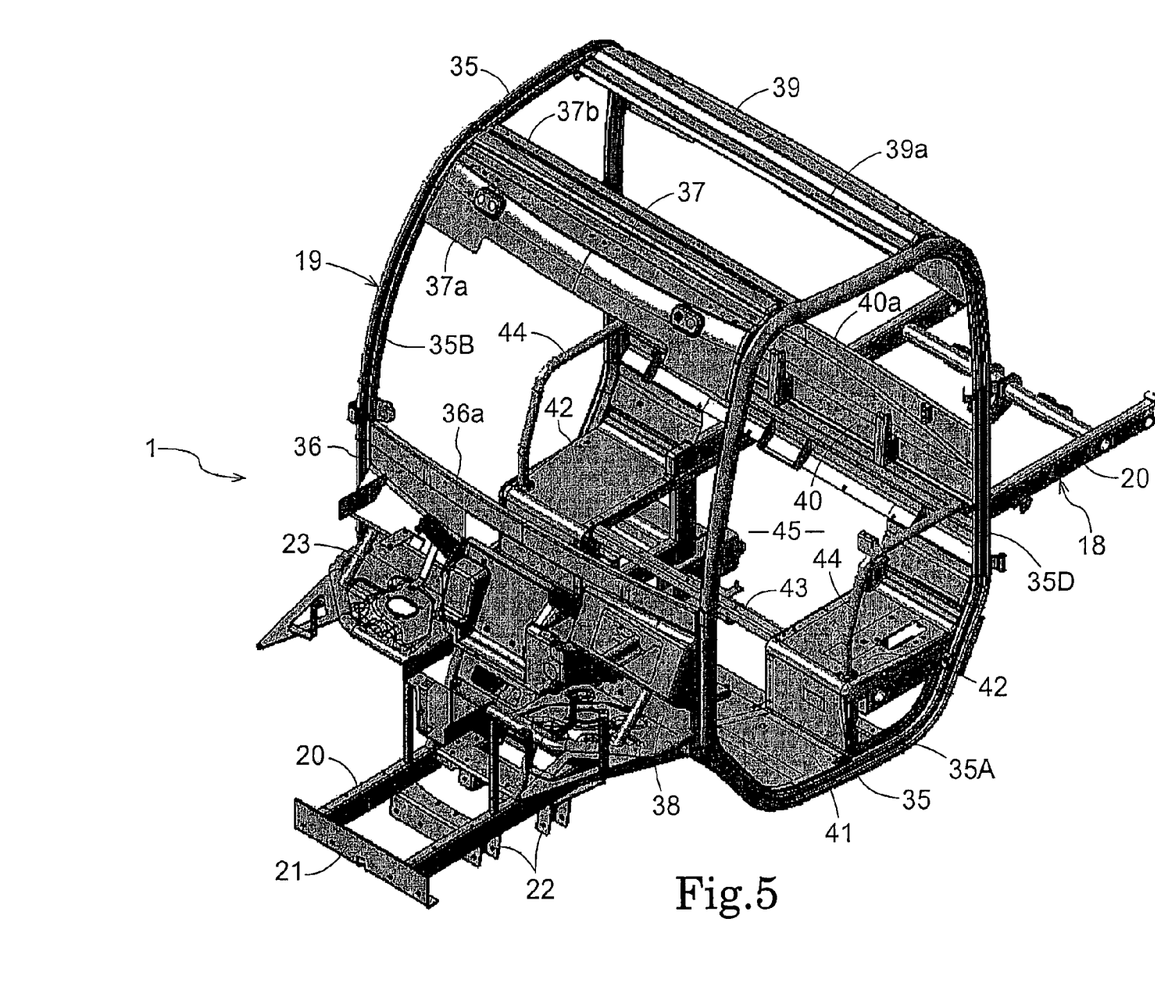
FIG. 5 is a perspective view showing the frame structure of the work vehicle.
Figure 6:
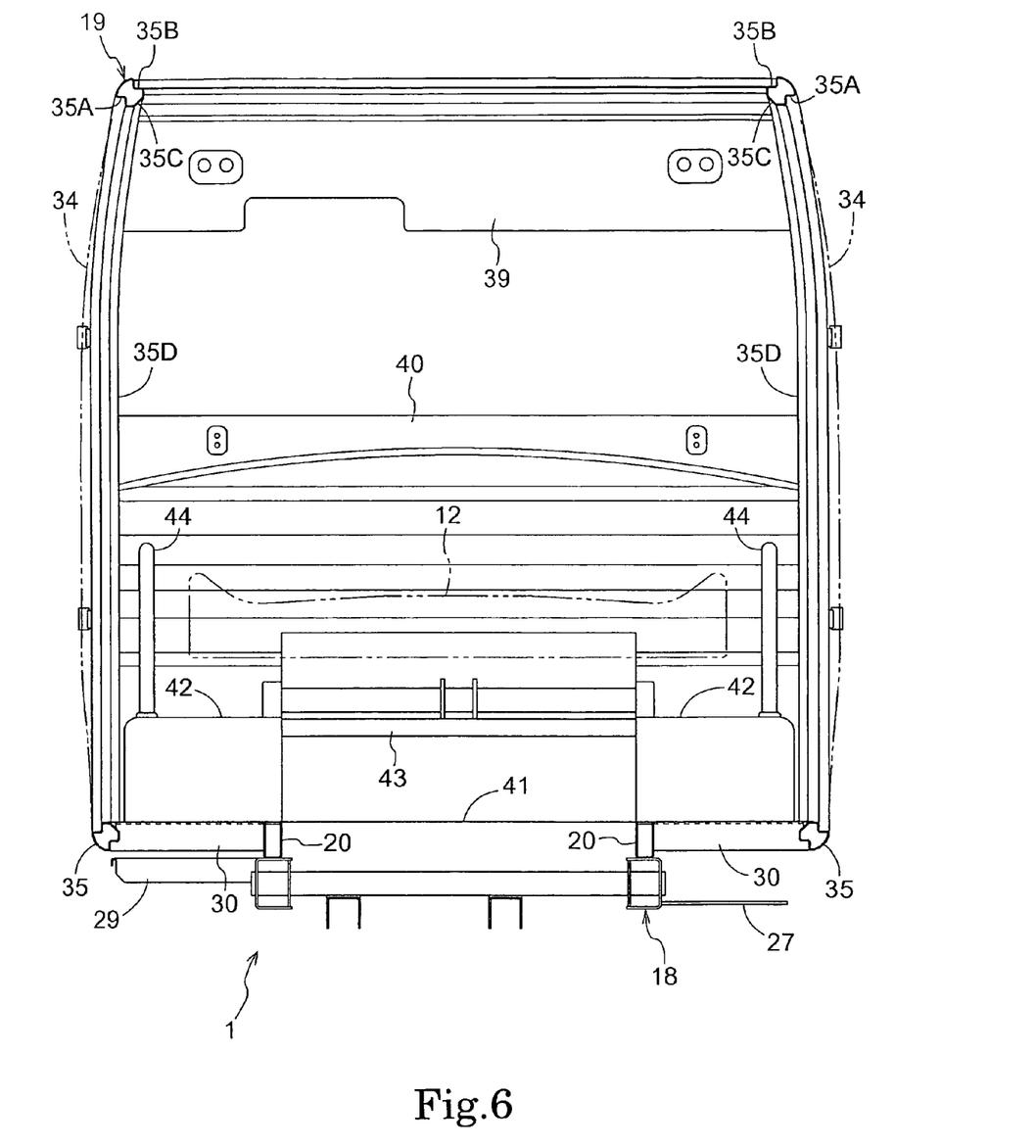
FIG. 6 is a vertical sectional front view of the frame structure of the work vehicle.

The 1st cross member 36 is formed and processed so that the upper outside surface 36a thereof is flush with the front receiving surface 35c of the side frame 35 on either side (see FIGS. 5 and 8).

The 2nd cross member 37 is formed and processed so that the front outside surface 37a is flush with the front receiving surface 35c of the side frame 35 on either side (see FIGS. 5 and 8).

That is, the 1st cross member's 36 top outside surface 36a and the 2nd cross member's 37 front part outside surface 37a can be used as a front receiving surface.

Figure 10:
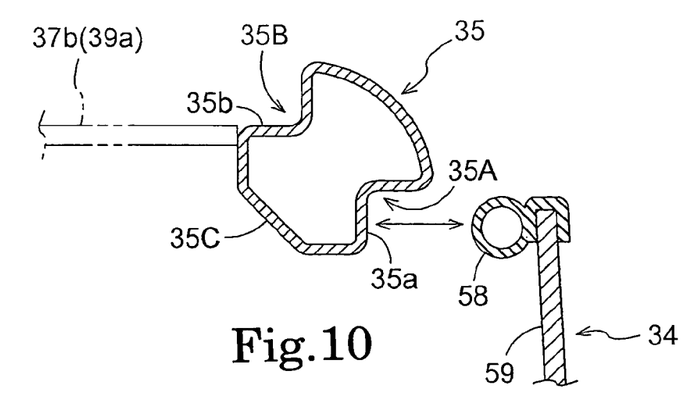
FIG. 10 is a cross-sectional vertical view of the receiving structure for the door and the roof panel at the rear upper part of the cabin.

The 2nd cross member 37 is formed and processed so that the rear outside surface 37b thereof is flush with the roof receiving surface 35b of the side frame 35 on either side (see FIGS. 5 and 10).

The 4th cross member 39 is formed and processed so that the front outside surface 39a thereof is flush with the roof receiving surface 35b of the side frame 35 on either side (see FIGS. 5 and 10).

That is, the 2nd cross member's 37 back outside surface 37b and the 4th cross member's 39 front part outside surface 39a can be used as a roof receiving surface.

The 4th cross member 39 is formed and processed so that the rear outside surface 39b thereof is flush with the rear receiving surface 35d of the side frame 35 on either side (refer to FIGS. 5 and 11).

The 5th cross member 40 is processed so that the upper outside surface 40a thereof is flush with the rear receiving surface 35d of the side frame 35 on either side (see FIGS. 5 and 11).

That is, the 4th cross member's 39 back outside surface 39b and the 5th cross member's 40 top outside surface 40a can be used as a rear receiving surface.

While not shown, the 3rd cross member 38 of the cabin frame 19, the 5th cross member 40, the 6th cross member 41, etc. are welded to the pair of right and left side members 20 in a base frame 18, the cross member 22 in an intermediate region in the fore and aft direction. Also, the respective side frame 35, etc. of the cabin frame 19 is welded to each connecting member 30 of a base frame 18.

As shown in FIGS. 1-6, and 8-13, the front panel 32 has the transparent curved-surface glass 50 with its peripheral edge provided with a weather strip 51. The upper edge portion of the panel 32 is connected with the 2nd cross member 37 with a pair of right and left hinges 52. And since the lower edge portion is connected with the 1st cross member 36 through a pair of right and left opening-and-closing holding fixture 53, opening and closing operation by a pivoting of the panel 32 about the supporting shaft 52A of each hinge 52 as well as the maintaining of the open position and the close position are made possible. It is also possible to use other transparent material such as transparent resin having a curved surface for the front panel 32.

The rear panel 33 has the transparent curved-surface glass 54 with its peripheral edge part provided with a weather strip 55. The upper edge portion is connected with the 4th cross member 39 through right and left hinges 56 and the lower peripheral portion is connected with the 5th cross member 40 through a pair of right and left opening-and-closing holding fixture 57. Thus, the opening and closing of the rear panel 33 by back and forward swinging about the supporting shaft 56A of hinge 56 as well as maintaining the panel in a desired open position and closed position are made possible.

Each door 34 on either side has a frameless construction with the transparent curved-surface glass 59 which has the peripheral edge part provided with the weather strip 58, the outside handle 60 which allows the opening and closing operation from outside the cabin, and the inner side handle 61 which allows the opening and closing operation from inside the cabin, and the holding mechanism 62 which allows the release operation from inside and outside the cabin. The rear edge of the door 34 is connected with the door fitting part 35D extending straight in the back central location of the side frame 35 by means of a pair of upper and lower hinges 63, which makes the opening and closing operation by lateral pivoting about the supporting shaft 63A of each hinge 63. As the door 34 is closed, the holding mechanism 62 engages the fixing bracket provided to the cabin frame 19 to hold the door 34 in position.

Because glass with curved-surface 50, 54, and 59 is used for the front panel 32, the rear panel 33, and right and left doors 34 that are operable to be opened and closed as mentioned above, the shape retaining characteristic is high which effectively prevents bending deformation resulting from an oscillation of the vehicle body, etc. This helps each member, when in the closed position, to maintain the degree of adherence to the cabin frame 19 leading to outstanding waterproof and airtight characteristics resulting in improvement in comfort level of the cabin 14.

Other Embodiments

[1] The work vehicle may be an agricultural work vehicle such as a tractor or a combine, or a construction vehicle such as a back hoe, and a foil loader, etc.

[2] The work vehicle may be one where the cabin 14 has only the cabin frame 19, or one that is equipped with cabin frame 19 only with the roof panel 31, or one that has the cabin frame 19 with the roof panel 31 and the front panel 32, or one that has only one of a right and left door 34 or one with a door 34 of a slide opening-and-closing type.

[3] A base frame 18 may have a support frame 24, which is welded to the base frame and which supports an engine 2 and the gear type speed change device 4 as well as the pair of right and left side members 20, and a plurality of cross members 21 and 22, etc.

[4] The side frame 35 may be formed in a looped shape with a gap in it, and may consist of a plurality of components.

[5] The side frame 35 may be comprised of an irregularly shaped pipe in which a single recess 35A running the entire length thereof, or a round pipe material or square pipe material with no recesses 35A or an extruded and fabricated material so that a desired configuration might be acquired, or the sheet-metal material punched into to a closed-loop form or looped shape may be used instead.

[6] A pipe material, an angle bar or channel material, etc. may be used as cross members 36-41. If an irregularly shaped pipe with a single V-shaped recess 35A extending in a straight line over the entire length is adopted for the 1st cross member 36, the 2nd cross member 37, the 4th cross member 39, and the 5th cross member 40 that support the roof panel 31, the front panel 32, or the rear panel 33, the recess 35A can be used as a receiving surface of a corresponding panel resulting in improvement in productivity as compared with the case where each receiving surface is additionally provided.

Figure 14:
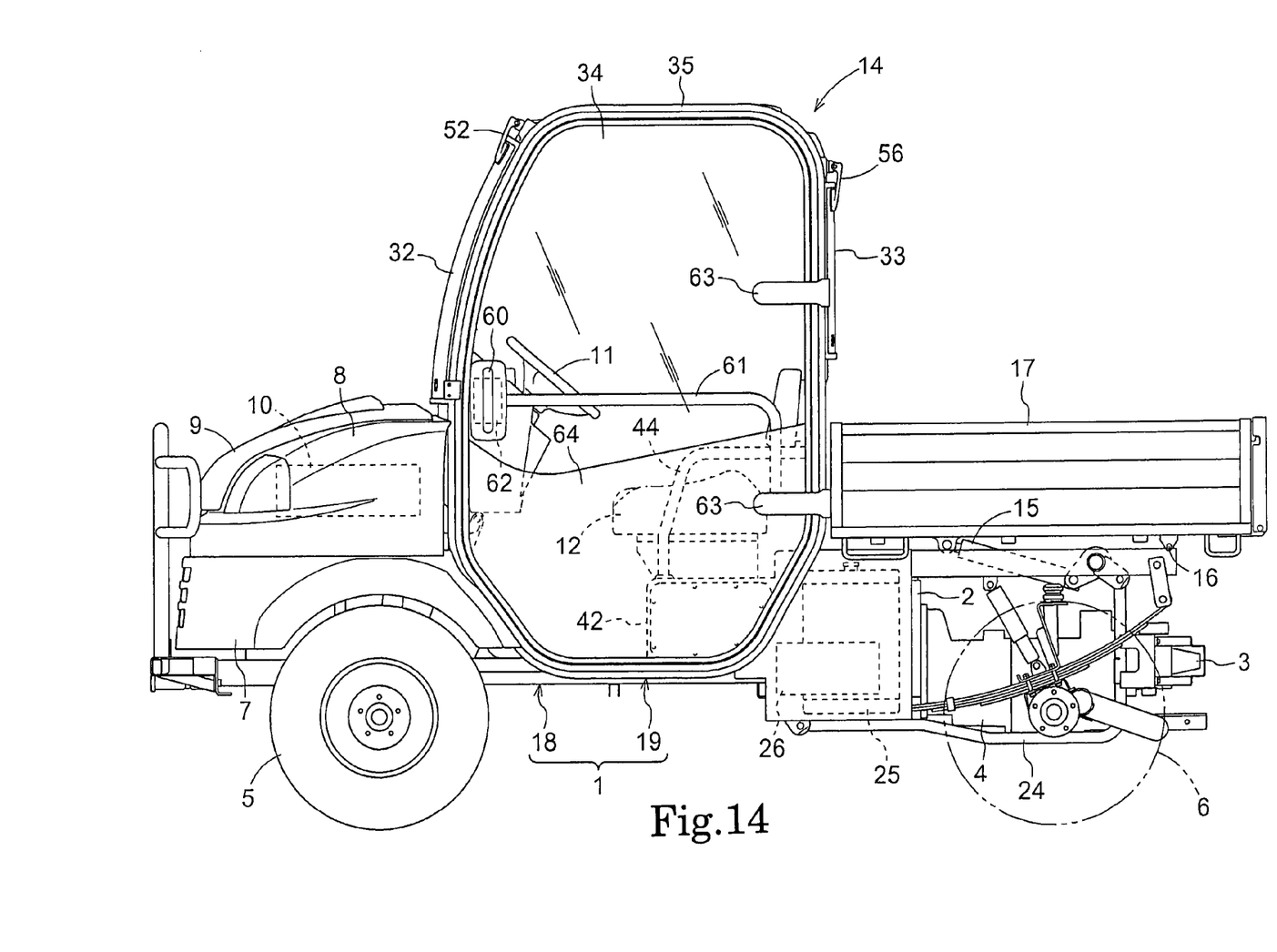
FIG. 14 is a side view of the work vehicle showing the door structure in accordance with another embodiment.

[7] As shown in FIG. 14, an outside cover 64 in a lower outside area of the door 34 is used for protection against damages and breakage of glass due to flying stone or for improving appearance. While not shown, when utilizing the outside cover 64, another outside cover 64 may be used to attach the outside cover in the lower inside face of the door 34. Further, an acoustically insulating material or thermally insulating material may be provided between the door 34 and the outside cover 64 or the inside cover for improved comfort level.

Resin material is preferably used for outside cover 64 although sheet metal may be used. The inner cover may have a pocket or a cup holder.

What is claimed is:

1. A vehicle frame for work vehicle comprising a cabin frame, the cabin frame including:
    a pair of side frames defining opposing entrances to the work vehicle, wherein each said side frame is formed with a single one-piece pipe material which has an irregular shape defining a pair of recesses formed on opposite sides thereof and extending along an entire length between a first end and a second end of the pipe material, with the first end connected to the second end such that a tangential direction extending along a region of the first end coincides with a tangential direction extending along a region of the second end;
    a plurality of cross members connecting the side frames;
    right and left doors provided in the respective entrances; and
    a front panel;
    a roof panel;
    a rear panel;
    wherein one of the recesses is an outside facing recess of each of the side frames and the other of the recesses is an inside facing recess of each of the side frames;
    wherein each of the right and left doors and the front panel and the rear panel are formed with a transparent material having a curved surface; and
    wherein each of the side frames is bent three-dimensionally such that each of the right and left doors is received in the outside facing recess to engage an outside inner periphery edge of the associated side frame along the entire periphery thereof, and such that the front panel, the roof panel, and the rear panel are received in the inside facing recess to engage an inner side perimeter edge of each of the side frames, the inner side perimeter edge defining a front receiving surface receiving the front panel, a roof receiving surface receiving the roof panel, and a rear receiving surface receiving the rear panel.

2. A vehicle frame according to claim 1, further comprising a base frame connected to the cabin frame, and wherein the base frame comprises a rear part for supporting a loading bay and a forward part for supporting a part of the vehicle that has a space covered with a hood, the rear part of the base frame being elevated with respect to the forward part and with the cabin frame fixed to both the forward part and the rear part of the base frame.

3. A vehicle frame according to claim 1, further comprising a base frame connected to the cabin frame, and wherein the base frame has a connecting member that extends horizontally to engage one of the recesses in the pipe material forming the associated side frames.

4. A vehicle frame according to claim 1, wherein the irregular shaped pipe material comprises a chamfered portion extending along the entire length between the first end and the second end, the chamfered portion forming an inner side inner periphery edge of each of the side frames.

5. A vehicle frame according to claim 1, further comprising a rear panel, and wherein the rear panel engages a rearward facing surface formed on one side face of the other recess forming the inner side perimeter edge of each side frame.

* * * * *